MAGAZINE-TYPE MAGNETIC TAPE RECORDER HAVING STEPPED TILTABLE DRIVE SHAFT TO ENGAGE TAPE REEL FLANGES FOR TWO-SPEED TWO-DIRECTION DRIVE

Filed Nov. 29, 1966 2 Sheets-Sheet 1

Inventor:-
Robert J. Hammond,
By Brown, Jackson, Boettcher & Dienner
Attys.

March 31, 1970 R. J. HAMMOND 3,504,135

MAGAZINE-TYPE MAGNETIC TAPE RECORDER HAVING STEPPED TILTABLE DRIVE SHAFT TO ENGAGE TAPE REEL FLANGES FOR TWO-SPEED TWO-DIRECTION DRIVE

Filed Nov. 29, 1966

2 Sheets-Sheet 2

Inventor:-
Robert J. Hammond,
By Brown, Jackson, Boettcher & Dienner
Attys.

United States Patent Office 3,504,135
Patented Mar. 31, 1970

3,504,135

MAGAZINE-TYPE MAGNETIC TAPE RECORDER HAVING STEPPED TILTABLE DRIVE SHAFT TO ENGAGE TAPE REEL FLANGES FOR TWO-SPEED TWO-DIRECTION DRIVE

Robert J. Hammond, Stevensville, Mich., assignor to V-M Corporation, Benton Harbor, Mich., a corporation of Michigan Filed Nov. 29, 1966, Ser. No. 597,607
Int. Cl. G11b 5/78
U.S. Cl. 179—100.2 15 Claims

ABSTRACT OF THE DISCLOSURE

Tape recording machine having tape wound between two superjacently spaced reels separately journalled to turn on non-coinciding spaced parallel axes and a tiltable motor having a stepped shaft therebetween which is tiltable to selectively locate its larger diametered section in driving engagement with one reel or its smaller diametered section in driving engagement with the other reel to simultaneously change tape direction and speed.

This invention relates to tape recording and reproducing machines and particularly to such machines as are provided with a removable tape magazine or cartridge.

It is known to provide magnetic tape recording-reproducing machines with tape magazines which are insertable and removable with respect to such machines. One advantage thereof is the convenient handling of the tape which the magazines provide. In some of said machines the tape supply and take up reels are mounted on a common wall in side-by-side relation and turn on parallel spaced axes and are adapted to be driven by a capstan which is caused to engage the portion of the tape extending between the two reels to traverse the recording head when the magazine is inserted into the machine. In other of said machines the tape reels are superposed and rotate about a common axis. Particularly in this latter type, provision is made for insertion of a drive shaft or capstan into a space left between the two reels and the shaft is made tiltable or otherwise adjustable so as to obtain selective driving contact with either of the two reels. In this latter arrangement the direction of feed of the tape depends on which of the two reels is driven by the capstan. Thus is provided a simple and economical means for shifting from "rewind" to "record" or "play" and back again without reversing the motor. However, the speed of the tape is not changed thereby and in the past change of the tape speed has been obtainable in such machines only by resorting to relatively complex mechanisms and/or electrical arrangements which change the driving speed of the capstan or the motor itself. Consequently where space is at a premium, as in the case of the so-called pocket-size or miniature recorders, although it is obviously desirable to be able to "rewind" the tape at a greater speed than when it is moved forwardly in recording, the customer has been to keep the rewind speed of the tape the same as the recording speed.

It is a principal object of the present invention to provide a tape recorder with novel means by which the tape reels may be selectively rotated at different speeds, as well as in different directions without also having to change the speed and/or direction of rotation of the drive motor.

Thus it is a feature of the present invention that a tiltable motor is provided with a stepped shaft arranged to protrude into the space between two super-adjacent reels and that the two reels are mounted to turn about offset although parallel axes wherefore the peripheral margin of the two reels can be drivingly engaged by differently diametered sections of the stepped shaft. Of consequence, when one reel is driven by th smaller diametered step of the shaft, not only is the tape moved in the opposite direction but it is also driven at a slower speed than that at which the motor drives the other reel when it is drivingly engaged by the larger diametered section of the stepped motor shaft.

Another feature of the present invention is that the aforementioned arrangement of tape reels in offset relation but aligned to define a plane paralleling the open end of the tape magazine permits the magazine to be insertable into the recording reproducing device in either of two positions such that either reel may be located topside and so that separate recordings may be made along the upper and lower longitudinal edge portions of one side of the tape. In either recording position the tape may be selectively driven by the stepped shaft in "forward" and "rewind" directions, and in the latter case also at a greater speed.

Another object of the invention is to provide a tape magazine or cartridge which is also simple in construction and which can be readily produced at low cost. Additional features of the invention include a novel construction of reels for such a cartridge wherein each reel includes a hub portion about which one end of the tape is coiled and has a single flange which is disposed internally of the magazine or cartridge housing in juxtaposed spaced relation to the corresponding flange of the second reel and constitutes the driven portion of the reel.

An ancillary feature of the invention which arises out of this novel construction of reels is that the outer walls of the cartridge may be provided with a transparent area through which one is able to visually inspect the quantity of tape left on the reels, the side of the reel flange facing the transparent area being of a lighter color which contrasts with the darker color of the tape coiled about the hub of the reel and resting against said single flange thereof.

A further feature of the invention is the provision of a raised continuous portion about the outer peripheral margin of the facing surfaces of the reel driving flanges which is frictionally engaged by the stepped shaft to selectively drive the tape onto said reel from the other reel.

Still another feature of the invention is the provision of novel means by which the stepped drive shaft is automatically positioned to drive the tape during a recording and/or reproducing operation and is also manually tiltable therefrom to an alternate position at the will of the operator for rewinding the tape back onto the supply reel.

Other and further objects, features and advantages of the present invention will be apparent from the following description of a preferred embodiment thereof given for the purpose of disclosure and taken in conjunction with the accompanying drawings, in which like character references designate like parts throughout the several views and where;

Figures 1, 2, 3, 6:
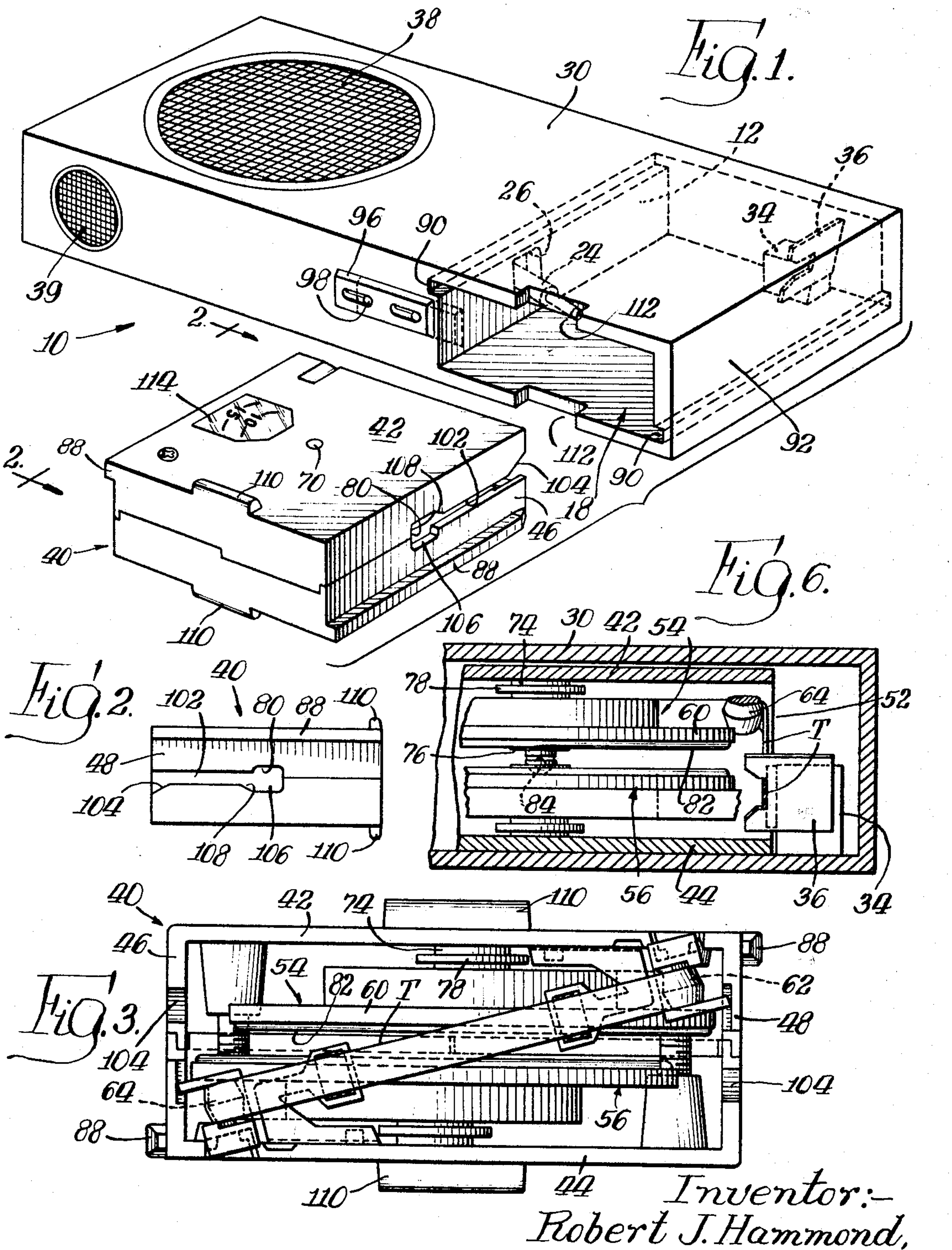
FIGURE 1 is a perspective view of a magnetic recording and reproducing machine constructed in accordance with the invention having a removable tape magazine or cartridge, the tape cartridge being shown out of the machine, but aligned with a provided receiving cavity for positionment therein.
FIGURE 2 is an elevational view of the tape cartridge taken along line 2—2 in FIGURE 1 looking in the direction indicated by the arrows.
FIGURE 3 is an enlarged elevational view of the tape cartridge looking into the open end thereof.
FIGURE 6 is a partial sectional view taken along line 6—6 of FIGURE 4 looking in the direction indicated by the arrows.
Figures 4, 5:
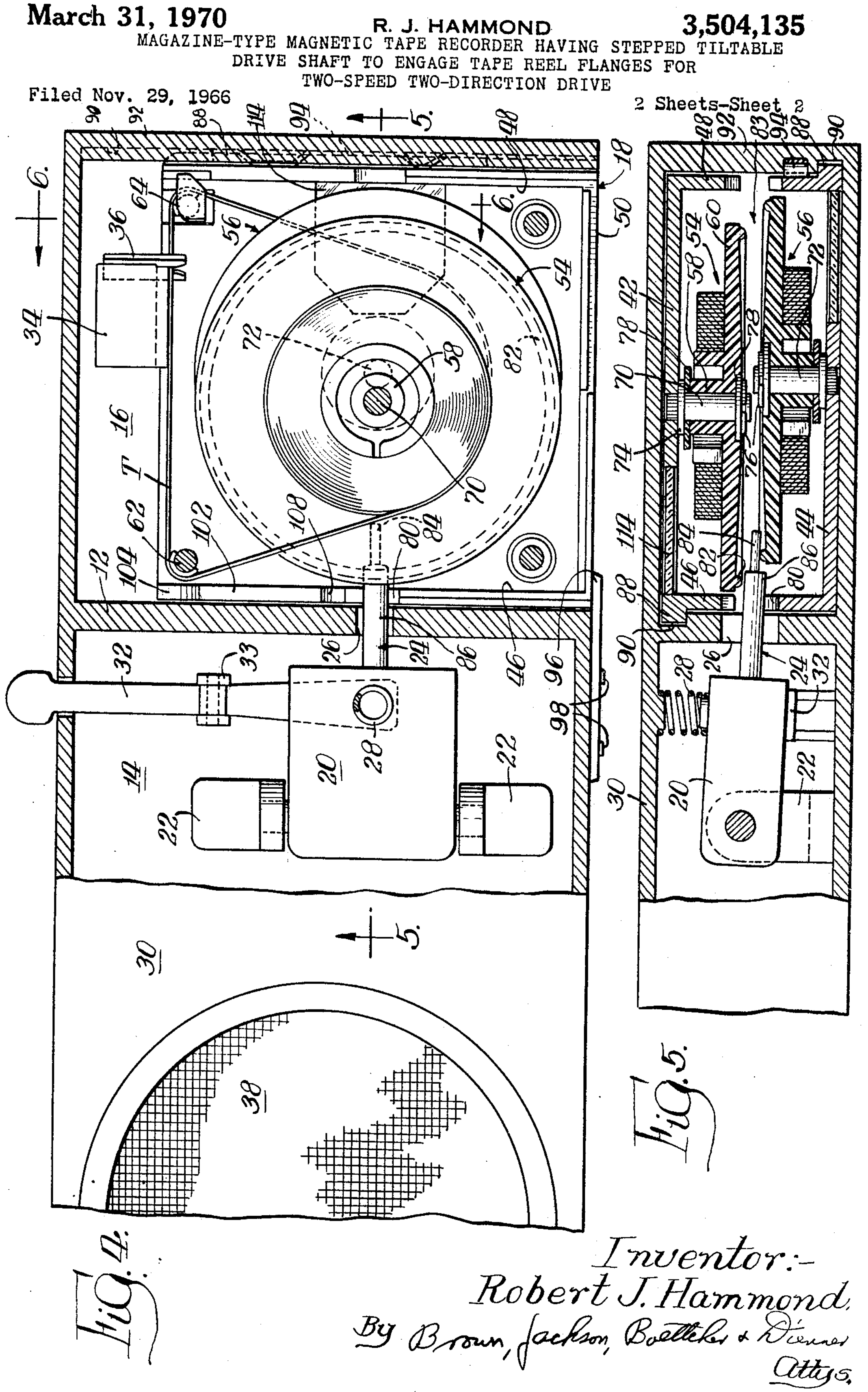
FIGURE 4 is a fragmented enlarged plan view of the magnetic recording and reproducing machine showing the tape cartridge inserted therein, portions of the cartridge and the machine being broken away to illustrate details in the construction thereof.
FIGURE 5 is a partial sectional view taken along line 5—5 of FIGURE 4 looking in the direction indicated by the arrows.

Referring now to the several figures and first to FIGURE 1, a magnetic recording and reproducing machine is shown as comprising a generally rectangular body 10 of suitably high impact plastic material such as polycarbonate resin. The interior of said housing 10 is shown in FIGURE 4 divided by transversely extending wall 12 into a pair of cavities. The first enclosed cavity 14 provides room for the various electronic components and operating circuitry required by the machine and the second comprises a tape magazine receiving cavity 16 having an entrance 18 (FIGURE 1) formed in the front wall of said housing 10. Within said first cavity 14 is an electric motor 20 (FIGURES 4 and 5) shown pivotally mounted on pivotal supports 22 and having a stepped drive shaft 24 which protrudes through a larger opening 26 in divider wall 12 so as to extend into the magazine receiving cavity 16 and to be freely reciprocal therein with tilting of motor 20 about pivots 22. At 28 is a spring which is compressed between top wall 30 of housing 10 and an outer casing portion of motor 20 so as to bias the motor and thereby its drive shaft 24 in a downward direction about pivots 22. At 32 is a lever shown pivotally mounted at 34 for tilting motor 20 in an upward direction about pivots 22 and against the bias of spring 28.

Within cavity 16 is a tape recording and reproducing transducer head 34 shown mounted to the rear wall 72 of the housing 10 and provided with a tape guide 36. It will be understood that head 34 is appropriately wired into an amplifier circuit (not shown), but which is understood to be contained within cavity 14 and includes a speaker indicated at 38 and a microphone 39. The microphone and speaker are separately connectable with the amplifier circuit and head in conventional manner to effect recording and play back.

In accordance with the present invention, a length of magnetic tape T is supported on a pair of reels confined with the housing of a tape magazine or cartridge shown generally at 40 in FIGURE 1. Magazine 40 is also formed of a suitable high impact plastic material such as the aforementioned polycarbonate resin and has a generally rectangular shape proportioned to fit snugly into the magazine cavity 16 when inserted through entrance 18 in the front wall of the magnetic recording-reproducing device 10. As shown, magazine 40 includes a top wall 42, a bottom wall 44 disposed in spaced parallel relation thereto, opposed side walls 46, 48 also in spaced parallel relation to each other, a rear wall 50 and an open end 52. Within magazine 40 are a pair of separately journalled means for winding a supply of tape T therebetween. Such means comprises a pair of superjacently disposed reels 54 and 56 (FIGURE 5), each of which includes an outwardly directed central hub portion 58 to which one end of the tape is fastened and coiled thereabout and an inwardly-located integral tape supporting flange 60. As shown best in FIGURE 4, one end of the tape T is coiled about the hub of one reel, for example reel 32, from whence it extends generally parallel with top wall 42 of the cartridge about a first tape guide 62 fixed in one corner of the open side of magazine 40 from whence it extends diagonally across said open end of the cartridge to a second tape guide 64 which is fixed in the opposite corner of the open end of the cartridge 30. From thence the tape passes parallel to the bottom wall 44 of the cartridge onto the other reel 56. Transducer head 34 previously described as located in the rear cavity 16 is so positioned that whether reel 54 or reel 60 is top side only the upper located longitudinal edge portion of the tape will traverse the head. In this way, recordings can be made separately on the upper and lower sections of one side of the tape T.

Referring now to FIGURE 5, it will be seen that tape reel 54 is journalled to rotate freely on a stud 70 which is frictionally or otherwise secured within a provided opening in top wall 42 of the magazine 40 and is disposed generally perpendicular thereto. Tape reel 56 is similarly journalled to rotate freely about a second stud 72 which is also secured in similar fashion to wall 44 of the cartridge and is perpendicularly disposed thereto. Studs 70 and 72, as illustrated best by FIGURES 5 and 6 are arranged in offset spaced relation so that they define non-coinciding axes about which reels 54 and 56 respectively rotate, stud 70 being located closer to side wall 46 and stud 72 closer to side wall 48, their axes defining a plane which includes the plane through which shaft 24 swings with tilting of motor 20 about pivots 22. The axes of said studs 70, 72 about which reels 54, 56 turn therefore also define a plane which is perpendicular to the axis about which motor 20 tilts and which also parallels the open end 52 of the cartridge 40. Each said studs 70 and 72 are preferably provided with an outstanding shoulder 74 which abuts adjacent wall 42 or 44 on which it is mounted. Retaining rings 76 are also secured to the opposite or inner ends of the studs and cooperate with shoulders 74 to prevent the reels from being longitudinally displaced on said studs. Preferably Teflon washers 78 are disposed about each said studs between reel hub 58 and shoulder 74 and also retainer 76 and the reel flange 60 so that they act as bearings to reduce friction and promote easy rotation of the reels about their respective mounting studs.

Referring now to FIGURE 5, shaft 24 of motor 20 is shown as extending through provided opening 80 in the cartridge wall 46 so that it lies within space 83 provided between the reel flanges 60 of the two reels 54 and 56. As illustrated, each said flange is of the same diameter but by reason of the offset location of their mounting studs 70, 72 the outer periphery of flange 60 of reel 54 is closer to cartridge wall 44 and flange 60 of reel 56 is closer to cartridge wall 48. As shown, the facing side of the two reel flanges are provided with peripherally located continuous annular ridges 82 which may be of rubber or other resilient material and comprise friction drive surfaces to be engaged by drive shaft 24. As illustrated, said drive shaft 24 has an outer end 84 of reduced diameter and an inner section 86 of larger diameter. Flange 60 of the lower reel 56 is so located that under the compressive action of spring 28 the smaller diametered end 84 of shaft 24 will engage ridge 82 thereof under the action of spring 28 so that rotation of the motor 20 will effectively rotate reel 56 in one direction. Reel 56 and its flange 60 is so offset in respect to reel 54 and its flange and is also so related to the axial dimension of the reduced shaft end 84 of motor shaft 24 that said flange 60 of the lower reel 56 is free to be rotated by the reduced end 84 of the motor shaft while out of engagement with the larger diametered section 86 thereof. On the other hand drive flange 60 of the upper reel 54 has its periphery disposed sufficiently close to wall 46 that when the motor 20 is tilted about pivots 22 against the compressive force 28 as by lever 32 the larger diametered section 86 of its drive shaft will be raised into engagement with ridge 82 on the underside of the flange of reel 54. Consequently rotation of drive shaft 24 will not only rotate reel 54 in a direction opposite to that in which it rotates reel 56 but it will also rotate reel 54 at a greater rate of speed in proportion to the increased circumferential dimension its larger diametered section 86 has with respect to the reduced diameter of the end 84 of the drive shaft. Thus in the released position of lever 32 the reduced end 84 of drive shaft 24 will be engaged with the flange of the lower reel 56 so as to rotate at a rate and in a forward direction appropriate for recording and/or reproducing on the edge portion of the tape which is moved thereby past head 34. However, when lever 32 is depressed, this effectively raises shaft 24 and with the result as long as the operator presses lever 32 the enlarged diameter section of the motor shaft will be held in engagement with the ridge 82 on the under face of flange 60 of the upper reel 54 so as to effect rotation of said reel and rewind the tape back onto the reel 54. Furthermore said rewinding of the tape onto the upper reel will be at a greater rate of speed and in proportion to the relative diameters of the two sections 84 and 86 of the motor shaft.

To assure proper alignment of the tape with head 34 when magazine 40 is located within cavity 16, the two side walls 44, 46 of the cartridge are provided with integrally formed outstanding guides 88 which have cooperative engagement with slideways 90 formed in the dividing wall 12 and sidewall 92 of the tape recording machine housing 10. Guides 88 and their receiving slideways 90 are so related that the magazine 40 may be effectively inserted into cavity 16 without special positioning and so that either wall 42 or 44 thereof may be located topside. Of consequence each edge of the tape may be separately recorded by withdrawing the magazine 40 from the cavity 16 through opening 18 after one edge thereof has been recorded and then inserting the magazine upside-down into the cavity. The aforedescribed mounting of the two reels 54, 56 is such that with either reel 56 or 54 topside reduced end 84 of the motor shaft will nevertheless engage the flange of the lower-located reel in order to drive the tape off the upper reel to effect moving the tape forwardly across the head in the proper direction and at the proper speed for recording and/or play back and when lever 32 is depressed to raise its larger diametered section into engagement with the flange of the upper located reel to effect rewind of the tape thereon.

A spring 94 attached to wall 92 extends longitudinally thereof and partially projects into cavity 16 so as to bear against the adjacent side wall of the tape magazine 40 in order to stabilize the same (FIGURE 4). A slide 96 is also shown in FIGURE 1 as attached to the front wall of the machine housing 10 and which is adapted for reciprocal movement determined by cooperating slots and pins indicated generally at 98 in order to releaseably lock magazine 40 in operative position within the cavity 16 of the machine.

Referring now to FIGURES 1, 2 and 5 it will be noted that both side walls 46 and 48 of the cartridge 40 are provided with a slot 80 previously referred to and which slot is generally T-shaped, the elongated portion 102 thereof opening into the end of said side wall adjacent the open end of the magazine. This permits reception of the motor shaft 24 during the act of inserting the magazine through entrance 18 and into cavity 16. Each said openings or slots 80 includes an inclined entrance surface 104 at the open end thereof which engages motor shaft 24 so as to raise it into the elongated portion 102 of the slot and so center it in the space 83 between the two reel flanges and out of engagement with both as the magazine is moved into place. The inner or terminal end of said opening 80 is enlarged as shown at 106 so that once the magazine is in place shaft 24 is free to pivot into its driving contact with the two reel flanges as previously described. To facilitate removal of the magazine from the cavity 16 a cam surface 108 is provided at the juncture of the slotted or elongated portion 102 with its enlarged portion 106. This camming surface 108 serves to cam the shaft 24 into slot 102 from enlarged portion 106 where it is again centered between the two reel flanges and out of engagement with both as the magazine is being removed.

Stop means in the form of lugs 110 are also provided adjacent the back wall 50 of the cartridge and which extend outwardly away from walls 42 and 44 so as to engage stop means such as indentations 112 formed in the top and bottom walls of the housng 10. Lugs 110 and indentations 112 cooperate to limit the depth to which the tape magazine is able to move into cavity 16. They thus serve to properly position the open end of the cartridge and thereby the tape with respect to head 26. In particular they serve to locate the cartridge 40 so that studs 70, 72 are properly disposed in the plane through which drive shaft 24 swings. They also locate the portion of the tape which diagonally extends between the tape retention pins or guides 62 and 64 so that it is disposed adjacent the head 26 and engages the same with sufficient pressure to assure proper sound reproduction on the tape or play back of sound therfrom. As hereinbefore stated, for economical use of the tape the two edges of the tape are separately recorded and the angular disposition of the portion of the tape between guides 62 and 64 are such that opposite edges of the tape cooperatively engage the head in the two possible positions of the magazine 40.

Referring again to FIGURE 1, a transparent insert 114 may be set into both the first and second walls 42, 42 in order to permit visually displaying the tape coiled on the hub of the reel positioned therebelow. With only one flange comprising each reel and the tape positioned between that flange and the transparent insert, the tape supply is easy to see. The face of the flange exposed to the transparent insert is also preferably colored white or other light color in oder to provide a contrasting background against which an observer views the darker colored tape supply.

Thus the present invention provides a double-deck magazine with offset tape winding means in the form of single flanged tape reels and a pivoted motor having a stepped drive shaft which is interposable between the flanges of the two reels for selective engagement thereof in order to permit changing the direction of movement and also the speed of the tape when the magazine is positioned in the recording and reproducing machine. The removable tape cartridge is also provided with appropriately located deflecting means in the form of tape guides so that as the tape is fed from one reel across the open end of the magazine to the other reel one edge of the tape will lie adjacent the transducer head therein. The reels are also arranged in offset but symmetrical positionment such that the magazine is reversible with the result that the two edges of the tape on the one side thereof are separately usable for recording purposse. The simple construction of the magazine with the tape permanently disposed therein prevents accidental twisting of the tape and eliminates the danger of damage thereto. The present invention thus provides an efficient and useful magazine in association with a tape recording and reproducing machine which is positive in operation and yet simply constructed of a minimum number of parts so as to be highly economical as well as practical and efficient in its operation.

I claim:

1. A tape recording machine comprising a housing containing a cavity with an entrance through one wall thereof for removably receiving a tape magazine, said magazine having a pair of superjacently disposed, separately-journalled tape reels, each said reels having a hub about which one end of a length of tape is coiled and a flange which supports the tape on said hub, the intermediate portion of the tape extending diagonally across one end of the magazine so as to traverse a transducer head supported within the cavity to be engaged by said portion of the tape when the magazine is properly positioned in said cavity, the flange on each said reels being in juxtaposed spaced parallel relation, a tiltable motor mounted in the machine housing having its shaft positioned in the space between said two juxtaposed spaced flanges of the two reels, the drive shaft including a longitudinal section of large diameter and a second section of smaller diameter, and resilient means normally urging said motor into a position where the smaller diametered section of its drive shaft drivingly engages the flange of one reel to rotate it in one direction, and means for tilting said shaft from said one position against the urging of said resilient means to a second position where the larger diametered section of its drive shaft engages the flange of the other reel so as to rotate it in an opposite direction and at a greater speed of rotation.

2. A tape recording machine as claimed in claim 1 wherein the tape magazine also includes deflecting means mounted at opposite corners of the open end of the magazine housing for guiding the tape in a diagonal path across the open end thereof between the two reels.

3. A tape recording machine comprising a housing containing a cavity with an entrance through one wall thereof for removably receiving a tape magazine, said magazine having a pair of superjacently disposed, sepa- and disposed to turn about non-coinciding parallel spaced rately-journalled tape reels, each of the same diameter axes, each said reels having a hub about which one end of a length of tape is coiled, the intermediate portion of the tape extending diagonally across one end of the magazine to traverse a transducer head supported within the cavity to be engaged by said portion of the tape when the magazine is properly positioned in said cavity, said reels each including a drive flange in spaced parallel relation to the drive flange of the other reel, a motor mounted in the machine housing and tiltable about an axis generally perpendicular to a plane containing said axis on which the reels turn, said motor having a shaft positioned in the space between said two drive flanges, the drive shaft including a longitudinal section of large diameter and a second section of smaller diameter, and said motor being tiltable between a first position where the smaller diametered section of its drive shaft drivingly engages the drive flange of one reel to rotate it in one direction and a second position where the larger diametered section of its drive shaft engages the drive flange of the other reel so as to rotate it in an opposite direction and at a greater speed of rotation.

4. A tape recording machine as claimed in claim 3 wherein resilient means yieldably retain said tiltable motor and its drive shaft in said first mentioned position, and the housing is provided with manually operable means for tilting the motor against the resilient means to locate its drive shaft in the second mentioned position.

5. A tape recording machine as claimed in claim 3 wherein the two reels are symmetrically arranged in the tape magazine and so that the magazine may be positioned within the cavity with either reel above the other and the head being so located in the cavity of the machine housing that only the upper edge portion of the tape traverses the same whereby the magazine may be located in the machine to permit separately recording on the two edge portions of the tape.

6. A tape recording machine comprising a housing containing a cavity with an entrance through one wall thereof for removably receiving a tape magazine, said magazine having a pair of superjacently disposed, separately-journalled tape reels which are of the same diameter and turn about non-coinciding spaced axes, each said reels having a hub about which one end of a length of tape is coiled, the intermediate portion of the tape extending diagonally across one end of the magazine so as to traverse a transducer head supported within the cavity to be engaged by said portion of the tape when the magazine is properly positioned in said cavity, said reels each including a drive flange in spaced parallel relation to the drive flange of the other reel, a tiltable motor mounted in the machine housing having its shaft positioned in the space between said two drive flanges, the movement of said motor in the tilting thereof being through a plane including said non-coinciding axes on which the reels turn, the drive shaft including a longitudinal section of large diameter and a second section of smaller diameter, and said motor being tiltable through said plane from one position where the smaller diameter section of its drive shaft drivingly engages the drive flange of one reel to rotate it in one direction to a second position where the larger diameter section of its drive shaft engages the drive flange of the other reel so as to rotate it in an opposite direction and at a greater speed of rotation.

7. A tape recording machine comprising, in combination, a pair of superjacently disposed rotatable members turning on non-coincident spaced parallel axes each having an end of a length of tape coiled thereabout, each said rotatable members including a driving flange in a spaced parallel relation to a driving flange of the other member, and a rotating drive shaft in the space between said flanges, said drive shaft including a longitudinal section of large diameter and a longitudinal section of smaller diameter, said rotatable shaft being movable between a position where its longitudinal section of smaller diameter drivingly engages the flange of one said member to rotate it in one direction and and an alternate position where its longitudinal section of larger diameter engages the flange of the other member so as to rotate it in an opposite direction and at a greater speed than the first rotatable member.

8. A magnetic recording and reproducing machine having spaced and superjacently mounted single flange tape reels, a tiltable motor provided with a stepped drive shaft, said shaft being located between the spaced reels and including a large diametered section and a smaller diametered end section, each said reels being disposed with its flanges in spaced parallel adjacent relation with the flange of the other reel such that when the motor shaft is tilted in one direction the large diameter section of the stepped motor shaft engages the flange of one of said reels and when tilted in the opposite direction its smaller diametered end section engages the flange of the other reel so as to effect rotation of said reels in opposite directions and at different speeds.

9. A magnetic recording and reproducing machine as claimed in claim 8 further comprising a tape magazine removably received in said machine, said tape magazine including a housing having first and second oppositely disposed and spaced walls, and said reels each being separately journalled on one said walls and disposed in superjacent relationship with a space therebetween for insertion of said stepped drive shaft which selectively engages the flanges of said reels whereby rotational direction and speed thereof is simultaneously changed.

10. A magnetic recording and reproducing machine comprising a tape magazine removably received in said machine, said tape magazine including a housing having first and second oppositely-disposed, spaced walls, and a pair of spaced superjacently mounted tape winding means in said magazine, each said winding means being separately journalled on one said walls and disposed in superjacent relationship with a space therebetween, one of said separately journalled winding means turning on a first axis disposed perpendicularly of the first wall and the other of said winding means turning on a second axis disposed perpendicularly of the second wall, said axes being parallel and offset with respect to each other, and a tiltable motor provided with a stepped drive shaft for insertion in said space in the magazine between the winding means, said shaft including a large diametered section and a smaller diametered end section, said shaft being so disposed that when tilted in one direction the large diametered section of the stepped motor shaft engages one of said winding means and when tilted in the opposite direction the smaller diametered end section engages the other winding means so as to effect rotation of said winding means in opposite directions and at different speeds.

11. The magnetic recording and reproducing machine according to claim 10 wherein said one winding means comprises a hub rotatably mounted about the first axis and a single tape supporting flange projecting therefrom, said other winding means comprising a hub rotatably mounted about the second axis and a single tape supporting flange projecting therefrom, said flanges being positioned on their repsective hubs away from the walls on which they are respectively mounted and in juxtaposed spaced relation to each other such that the portions of the supply of tape wound about the respective hubs form a coil on each of said flanges.

12. The magnetic recording and reproducing machine according to claim 11 wherein said drive flanges have annular projections about the peripheral margin of their facing surfaces for driving engagement by said drive shaft.

13. The magnetic recording and reproducing machine according to claim 11 wherein said tape magazine further comprises deflecting means for guiding an intermediate portion of the tape along a diagonal scanning path.

14. The magnetic recording and reproducing machine according to claim 13 further comprising means for locating said magazine in the magnetic recording and reproducing device.

15. The magnetic recording and reproducing machine according to claim 14 wherein at least one of said walls has an aperture through which tape coiled on the hub of the winding means is visible.

References Cited

UNITED STATES PATENTS

| | | | |
|---|---|---|---|
| 2,768,244 | 10/1956 | Tiger | 179—100.2 |
| 2,819,350 | 1/1958 | Steinegger | 179—100.2 |
| 3,250,481 | 5/1966 | Motoshi Seki | 179—100.2 |
| 3,352,169 | 11/1967 | Delin et al. | 179—100.2 |
| 3,352,976 | 11/1967 | Gonmori | 179—100.2 |

OTHER REFERENCES

Ser. No. 122,145, Storch (A.P.C.), published May 4, 1943.

BERNARD KONICK, Primary Examiner

J. P. MULLINS, Assistant Examiner

U.S. Cl. X.R.

242—55.13; 274—4

PO-1050
(5/69)

UNITED STATES PATENT OFFICE
CERTIFICATE OF CORRECTION

Patent No. 3,504,135 Dated March 31, 1970

Inventor(s) Robert J. Hammond

It is certified that error appears in the above-identified patent and that said Letters Patent are hereby corrected as shown below:

Column 7, lines 12 and 13 are reversed.

SIGNED AND
SEALED
JUL 14 1970

(SEAL)
Attest:

Edward M. Fletcher, Jr.
Attesting Officer

WILLIAM E. SCHUYLER, JR.
Commissioner of Patents